United States Patent
Buttry

(10) Patent No.: US 9,056,275 B2
(45) Date of Patent: Jun. 16, 2015

(54) CAPTURE AND RELEASE OF CARBON DIOXIDE

(75) Inventor: Daniel A. Buttry, Tempe, AZ (US)

(73) Assignee: ARIZONA BOARD OF REGENTS, A BODY CORPORATE OF THE STATE OF ARIZONA ACTING FOR AN ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 0 days.

(21) Appl. No.: 14/238,997

(22) PCT Filed: Aug. 17, 2012

(86) PCT No.: PCT/US2012/051362
§ 371 (c)(1),
(2), (4) Date: May 27, 2014

(87) PCT Pub. No.: WO2013/025999
PCT Pub. Date: Feb. 21, 2013

(65) Prior Publication Data
US 2014/0271434 A1 Sep. 18, 2014

Related U.S. Application Data

(60) Provisional application No. 61/525,059, filed on Aug. 18, 2011.

(51) Int. Cl.
| C07F 9/02 | (2006.01) |
| B01D 53/48 | (2006.01) |
| B01D 53/56 | (2006.01) |
| C01B 31/24 | (2006.01) |

(Continued)

(52) U.S. Cl.
CPC .......... B01D 53/62 (2013.01); C01B 31/20 (2013.01); B01D 53/326 (2013.01); B01D 53/965 (2013.01); B01D 2252/30 (2013.01); B01D 2257/504 (2013.01); B01D 2258/0283 (2013.01); Y02C 10/04 (2013.01)

(58) Field of Classification Search
CPC ....... B01D 53/00; B01D 53/32; B01D 53/326
USPC .................. 558/149, 243; 423/224, 210, 226, 423/242.1, 419.1, 437.1; 205/763, 355
See application file for complete search history.

(56) References Cited

U.S. PATENT DOCUMENTS

| 7,842,126 B1 | 11/2010 | Dilmore |
| 7,919,064 B2 | 4/2011 | Kawatra |

(Continued)

OTHER PUBLICATIONS

Scovazzo et al., "Electrochemical Separation and Concentration of <1% Carbon Dioxide from Nitrogen", Journal of the Electrochemical Society (no month, 2003), vol. 150, No. 5, pp. D91-D98.*

(Continued)

*Primary Examiner* — Edna Wong
(74) *Attorney, Agent, or Firm* — Fish & Richardson P.C.

(57) ABSTRACT

Carbon dioxide capture and release includes contacting a gas comprising carbon dioxide with a mixture comprising a precursor and a solvent and reducing the precursor to form a capture agent. The capture agent is reacted with the carbon dioxide to form a non-volatile species containing carbon dioxide. The non-volatile species is oxidized to regenerate the precursor and to release carbon dioxide. The mixture may be formed by combining the precursor and the solvent.

15 Claims, 5 Drawing Sheets

(51) Int. Cl.
- *C01B 31/20* (2006.01)
- *B01D 17/06* (2006.01)
- *C25B 3/00* (2006.01)
- *B01D 53/62* (2006.01)
- *B01D 53/32* (2006.01)
- *B01D 53/96* (2006.01)

(56) References Cited

U.S. PATENT DOCUMENTS

| | | | |
|---|---|---|---|
| 2008/0072496 A1 | 3/2008 | Yogev | |
| 2008/0286643 A1* | 11/2008 | Iwasaki | 429/111 |
| 2012/0063978 A1* | 3/2012 | Baugh et al. | 423/228 |
| 2012/0288431 A1 | 11/2012 | Chizmeshya et al. | |

OTHER PUBLICATIONS

Brennecke et al., "Ionic Liquids for $CO_2$ Capture and Emission Reduction", J. Phys. Chem. Lett. (no month, 2010), vol. 1, pp. 3459-3464).*

International Search Report and Written Opinion of International Application No. PCT/US2012/051362 mailed Feb. 21, 2013, 8 pages.

Choi, S., Drese, J.H., & Jones, C.W., Adsorbent Materials for Carbon Dioxide Capture from Large Anthropogenic Point Sources. Chemsuschem 2 (9), 796-854 (2009).

Wolf, G.H., Chizmeshya, A.V.G., Diefenbacher, J., & McKelvy, M.J., In situ observation of $CO_2$ sequestration reactions using a novel microreaction system. Environmental Science & Technology 38 (3), 932-936 (2004).

Pennline, H.W. et al., Progress in carbon dioxide capture and separation research for gasification-based power generation point sources. Fuel Processing Technology 89 (9), 897-907 (2008).

Moganty, S.S. & Baltus, R.E., Regular Solution Theory for Low Pressure Carbon Dioxide Solubility in Room Temperature Ionic Liquids: Ionic Liquid Solubility Parameter from Activation Energy of Viscosity. Industrial & Engineering Chemistry Research 49 (12), 5846-5853 (2010).

Sanchez, L.M.G., Meindersma, G.W., & de Haan, A.B., Kinetics of absorption of $CO_2$ in amino-functionalized ionic liquids. Chemical Engineering Journal 166 (3), 1104-1115 (2011).

Stueber, D., Orendt, A.M., Facelli, J.C., Parry, R.W., & Grant, D.M., Carbonates, thiocarbonates, and the corresponding monoalkyl derivatives: III. The C-13 chemical shift tensors in potassium carbonate, bicarbonate and related monomethyl derivatives. Solid State Nuclear Magnetic Resonance 22 (1), 29-49 (2002).

Stueber, D. et al., Carbonates, thiocarbonates, and the corresponding monoalkyl derivatives. 1. Their preparation and isotropic C-13 NMR chemical shifts. Inorganic Chemistry 40 (8), 1902-1911 (2001).

Stueber, D., Arif, A.M., Grant, D.M., & Parry, R.W., Carbonates, thiocarbonates, and the corresponding monoalkyl derivatives. 2. X-ray crystal structure of potassium methyltrithiocarbonate ($KS_2CSCH_3$). Inorganic Chemistry 40 (8), 1912-1914(2001).

Shouji, E. & Buttry, D.A., A mechanistic study of the influence of proton transfer processes on the behavior of thiol/disulfide redox couples. Journal of Physical Chemistry B 103(12), 2239-2247 (1999).

Persson, B., Electrochemical Reduction of S-Oxides of Diphenyl Disulfide .1. Investigation in Aprotic-Solvents. Journal of Electroanalytical Chemistry 86 (2), 313-323 (1978).

Hammond, G.P. & Akwe, S.S.O., Thermodynamic and related analysis of natural gas combined cycle power plants with and without carbon sequestration. International Journal of Energy Research 31, 1180-1201 (2007).

Danckwerts, P.V., The reaction of $CO_2$ with ethanolamines. Chemical Engineering Science 34 (4), 443-446, (1979).

Ishida, H. et al., Interaction between $CO_2$ and Electrochemically Reduced Species of N-propyl-4,4'-bipyridinium Cation. Chemistry Letters 905-908 (1994).

Appetecchi, G.B. et al., Synthesis of Hydrophobic Ionic Liquids for Electrochemical Applications. Journal of the Electrochemical Society, 153 (9), A1685-A1691 (2006).

Authorized Officer Mineko Mohri, International Preliminary Report on Patentability for International Application No. PCT/US2012/051362, mailed Feb. 27, 2014, 5 pages.

Authorized Officer Lim Do Kyung, International Search Report and Written Opinion for International Application No. PCT/US2012/051362, mailed Feb. 21, 2013, 8 pages.

* cited by examiner

CAPTURE AND RELEASE OF CARBON DIOXIDE

CROSS-REFERENCE TO RELATED APPLICATIONS

This application is a U.S. National Phase Application of International Patent Application No. PCT/US2012/051362 filed Aug. 17, 2012, which claims the benefit of U.S. Application Ser. No. 61/525,059, entitled "Capture and Release of Carbon Dioxide" and filed on Aug. 18, 2011, the contents of both of which are incorporated herein by reference in their entirety.

TECHNICAL FIELD

This invention is related to electrochemical and/or chemical capture and release of carbon dioxide.

BACKGROUND

Several approaches have been described that enable the capture of $CO_2$. Some of these approaches allow for controllable release at a later time. One process involves reaction of $CO_2$ with amines, such as ethanolamine, to give an adduct formed by nucleophilic attack of the amine group ($RNH_2$) at the carbon center in $CO_2$. This is typically done in aqueous solution and at relatively high pH, such that the resulting adduct, a carbamic acid derivative ($RNHCO_2H$), is deprotonated to give the anionic carbamate species ($RNHCO_2^-$), thereby inhibiting loss of $CO_2$ from solution by volatilization. This deprotonation can later be reversed by increasing the temperature to drive loss of $CO_2$ and thereby recharge the amine for another cycle of capture. Other reaction conditions have been used, for example, in which the amine group is contained within other liquids (e.g., ionic liquids) or in which the amine functionality is immobilized in some way on a solid support, such as silica or carbon. While the reaction of $CO_2$ with amines in these cases is spontaneous and relatively fast, the release of $CO_2$ to regenerate the amine capture agent typically requires the input of a significant amount of energy, usually in the form of thermal energy. Thus, the solution generally must be heated to reverse the $CO_2$ binding and release the $CO_2$ from its trapped state as a carbamic acid or a carbamate. The energy required for this step is related to the heat capacity of the amine solution or amine/support system used for capture. This requirement for large amounts of thermal energy to release the $CO_2$ and to regenerate the compound used to capture $CO_2$ limits the overall efficiency of the round-trip capture/release process.

Another process includes the electrochemical reduction of parent quinones to yield quinone dianions that form adducts including two equivalents of $CO_2$. Oxidation of the quinone dianion-$CO_2$ adduct (an organic carbonate) releases the $CO_2$ and regenerates the quinone. However, it is widely known that quinones react with dioxygen at high rates. Thus, the implementation of quinone capture agents for $CO_2$ from a gas stream, such as flue gas, may not be practical, given that post-combustion gas streams contain high concentrations of $O_2$.

Mineralization has also been discussed as a method to capture $CO_2$. In this case, $CO_2$ is reacted with a variety of minerals (typically oxides or hydroxides) under high temperature and/or high pressure conditions to produce a carbonate-containing or bicarbonate-containing mineral. These processes also consume large amounts of energy and are generally irreversible in a practical sense (i.e., typically reversible only with input of very large amounts of thermal energy).

$CO_2$ capture in ionic liquids (ILs) or in membranes or other support structures that contain ILs has also been described. $CO_2$ can exhibit good solubility in some ILs. For example, $CO_2$ solubility in N-butyl-N-methyl-pyrrolidinium bis(trifluoromethanesulfonyl)imide (BMP-TFSI) can reach as high as 0.1 moles/liter (M) at 300 K and 1 atmosphere of $CO_2$ pressure. However, the reverse of the $CO_2$ capture process is relatively facile, which can lead to easy loss of $CO_2$ from the IL other than at the desired time or location. When amines are attached to ILs as pendent groups, the $CO_2$ that contacts the IL may react with the pendent amine group, thereby forming a carbamic acid or carbamate species. This chemistry can effect the capture of the $CO_2$. However, as noted above, the release step typically requires input of large amounts of thermal energy to drive the binding equilibrium backwards to release $CO_2$ from the carbamic acid or carbamate.

SUMMARY

Implementations of the present disclosure are directed to devices, systems, and techniques for electrochemical and/or chemical capture of $CO_2$, including atmospheric capture or capture from gas streams such as flue gas, and its subsequent release. As described herein, a process for $CO_2$ capture includes electrochemical or chemical generation of a nucleophile (the capture agent) from a precursor. The capture agent reacts with $CO_2$ to form an adduct, thereby capturing $CO_2$. The capture agent is advantageously selected to react with $CO_2$ to form an adduct more rapidly than it reacts with $O_2$, thereby capturing $CO_2$ with little or no interference from $O_2$ and effecting separation of $CO_2$ (e.g., from a gas stream). The adduct can subsequently be treated electrochemically or chemically to release the bound $CO_2$ and to regenerate the capture agent.

In an example, a disulfide dissolved in an ionic liquid is reduced to form a thiolate which then reacts with $CO_2$ in contact with the ionic liquid (e.g., at the gas-liquid interface or dissolved in the ionic liquid) to form a thiocarbonate (i.e., a monothiocarbonate). An exemplary thiocarbonate formed in this way is S-benzyl thiocarbonate, $Ph-CH_2SCO_2^-$, in which Ph represents a phenyl group. As described herein, thiocarbonates can be generated rapidly from the reaction of thiolates (e.g., $RS^-$, where R represents any alkyl, aryl or other type of group to which the thiolate moiety is attached) with carbon dioxide, and the resulting thiocarbonate can be oxidized electrochemically or chemically in a kinetically facile way to release $CO_2$ and regenerate the disulfide compound. The facile and readily reversible means of $CO_2$ capture and release described herein can improve energy efficiency compared to methods requiring the input of thermal energy.

In a first aspect, carbon dioxide capture and release includes contacting a gas comprising carbon dioxide with a mixture comprising a precursor and a solvent and reducing the precursor to form a capture agent. The capture agent reacts with the carbon dioxide to form a non-volatile species containing carbon dioxide. The non-volatile species is oxidized to regenerate the precursor and to release carbon dioxide.

As described herein, a "non-volatile species" is understood to refer to a species that is less volatile than water, based on vapor pressures, at room temperature. As understood by one of ordinary skill in the art, salts are generally referred to as "non-volatile" because they have a low vapor pressure at room temperature, at least in part because charged species go into the gas phase as neutral pairs (cation and anion), which requires more energy than a neutral species. In one example, a non-volatile species has a vapor pressure of about 1 mm Hg or less at room temperature.

Implementations may include one or more of the following features. For example, in some cases, the mixture is formed by combining the precursor and the solvent. The precursor and/or the capture agent may be coupled to a membrane or immobilized on a conductive support. The capture agent can react with $CO_2$ at the gas-liquid interface, $CO_2$ dissolved in the solvent, or both. The solvent can be an ionic liquid, the precursor can be a disulfide, or both. A temperature of the solvent may be at least 100° C. In certain cases, the capture agent is a nucleophile (e.g., a thiolate). The precursor and/or the capture agent may be coupled to the solvent. The non-volatile species may be, for example, a thiocarbonate. In some cases, the non-volatile species is collected, stored, and/or transported before it is oxidized. The released carbon dioxide may be collected, compressed, or transported for later use. In one example, the electrochemical energy of the release process is used to compress the gas. Oxygen may also be dissolved in the solvent, and the capture agent may advantageously react with the carbon dioxide to form an adduct more rapidly than it reacts with the oxygen.

Reducing the precursor may include electrochemically reducing the precursor. The precursor may be electrochemically reduced (e.g., continuously) proximate a cathode in an electrochemical cell. A reductant may be oxidized simultaneously at an anode electrically coupled to the cathode.

Oxidizing the non-volatile species may include electrochemically oxidizing the non-volatile species (e.g., proximate an anode in an electrochemical cell). Electrochemically oxidizing the non-volatile species may occur continuously proximate the anode. An oxidant may be reduced simultaneously at the cathode.

Contacting the gas comprising carbon dioxide with the solvent may include, for example, flowing the gas over the solvent, through the solvent, or both. In certain cases, the gas comprising carbon dioxide is a flue gas.

These general and specific aspects may be implemented using a device, system or method, or any combination of devices, systems, or methods. The details of one or more embodiments are set forth in the accompanying drawings and the description below. Other features, objects, and advantages will be apparent from the description and drawings, and from the claims.

BRIEF DESCRIPTION OF THE DRAWINGS

The concepts herein may be more completely understood in consideration of the following detailed description of various embodiments in connection with the accompanying drawings.

DETAILED DESCRIPTION

As described herein, $CO_2$ is captured by reaction with a nucleophile (the capture agent) formed chemically or electrochemically from a precursor compound. The resulting $CO_2$ adducts can be electrochemically or chemically oxidized later, thereby releasing the $CO_2$ and regenerating the capture agent or its precursor. The $CO_2$ may be captured in a non-volatile form, inhibiting the subsequent loss of the trapped $CO_2$ until such time as the capture step is electrochemically or chemically reversed to release the captured $CO_2$.

Figure 1:
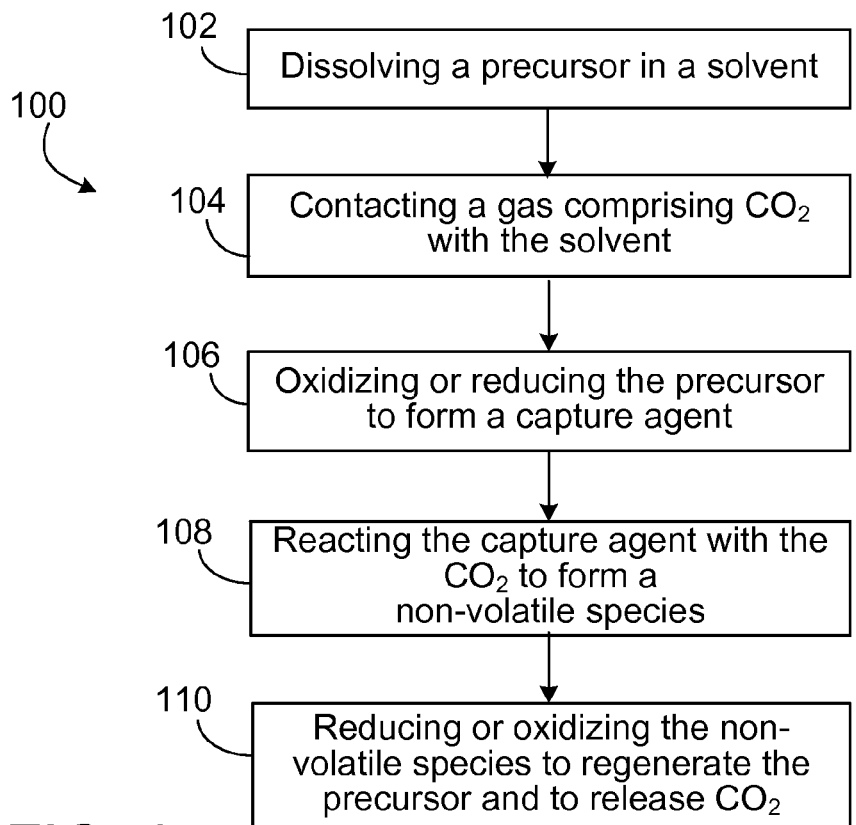
FIG. 1 is a flowchart showing an illustrative process for capture and release of carbon dioxide.

As shown in FIG. 1, $CO_2$ capture and release process 100 includes combining a precursor and a solvent to form a mixture 102 and contacting a gas comprising $CO_2$ with the solvent 104. Combining the precursor and the solvent may include dissolving the precursor and the solvent. In 106, the precursor is electrochemically or chemically converted (e.g., reduced or oxidized) to form a capture agent. The capture agent may be, for example, a nucleophile. In 108, the capture agent reacts with $CO_2$ to form a non-volatile species in solution. As described herein, a "non-volatile species" is understood to refer to a species that is less volatile than water, based on vapor pressures at room temperature. As understood by one of ordinary skill in the art, salts are referred to as "non-volatile" because they have a low vapor pressure at room temperature, at least in part because charged species go into the gas phase as ion pairs (cation and anion), which requires more energy than a neutral species. In one example, a non-volatile species has a vapor pressure of about 1 mm Hg or less at room temperature.

The capture agent can react with $CO_2$ at the gas-liquid interface, $CO_2$ dissolved in the solvent, or both. The non-volatile species may be, for example, a carbonate or a carbonate derivative, such as a thiocarbonate. In 110, the non-volatile species formed in 108 is electrochemically or chemically converted (e.g., oxidized or reduced) to regenerate the precursor and to release $CO_2$ from the solution. In some cases, operations in the process shown in FIG. 1 occur in a different sequence than shown. For example, contacting the gas comprising $CO_2$ with the solvent can occur after oxidizing or reducing the precursor to form a capture agent, or at any time during process 100. In certain cases, operations in the process, such as combining the precursor and the solvent to form the mixture, may be omitted or optional (e.g., the mixture may be pre-formed).

Equations 1-3 below demonstrate the process described in FIG. 1 for a disulfide precursor.

$$RSSR + 2e^- \leftrightarrow 2RS^- \quad (1)$$

$$RS^- + CO_2 \leftrightarrow RSCO_2^- \quad (2)$$

$$2RSCO_2^- \leftrightarrow 2CO_2 + RSSR + 2e^- \quad (3)$$

In this representation, each R is independently a functional group, such as an alkyl, aryl, heteroalkyl, or heteroaryl functional group, attached to one sulfur of a disulfide. Thus, RSSR may be expressed as RSSR'. For simplicity in Equations 1-3, however, the functional groups are both indicated as R. Equation 1 represents the electrochemical reduction of such a disulfide by two electrons with resulting cleavage of the S—S bond, producing two equivalents of the corresponding thiolate, $RS^-$ (or $RS^-$ and $R'S^-$). As used herein, R may be used to denote a combination of moieties, such as $R_1R_2R_3N^+R_4$, in which $R_1$, $R_2$, $R_3$, and $R_4$ are independently moieties such as alkyl, heteroalkyl, aryl, or heteroalkyl moieties. The thiolate is a nucleophile, and attacks $CO_2$ at the C atom to form an S-bound thiocarbonate, $RSCO_2^-$, as shown in Equation 2. Thiocarbonates are generally understood to be "non-volatile" at least because they are present in a charged form and therefore a lower volatility than a neutral compound, such as water.

Equation 3 represents the regeneration step in which the thiocarbonate is oxidized, regenerating the disulfide and releasing $CO_2$. The thiocarbonate, electrochemically oxidizable at an unexpectedly low potential, provides a facile means to release $CO_2$. The stoichiometry of the regeneration step involves oxidation of two molecules of thiocarbonate to produce two molecules of $CO_2$ and one disulfide.

As described herein, the reactions shown in Equations 1-3 occur in a solvent in which $CO_2$ has a high solubility. Suitable solvents include aqueous and non-aqueous solvents, polymeric media that act as solvents, ionic liquids, and combinations thereof. Examples of non-aqueous solvents include dimethylformamide, dimethylsulfoxide, N-methylpyrrolidone, acetonitrile, and the like. Examples of polymeric media which act as solvents include cross-linked cellulose, and poly (methyl methacrylate). Examples of ionic liquids include 1-butyl-1-methylpyrrolidinium bis(trifluoromethylsulfonyl) imide (BMP TFSI), 1-ethyl-3-methylimidazolium TFSI, N-butyl-N-methymorpholinium hexafluorophosphate, as well as the compounds shown below.

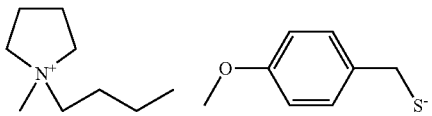

While suitable solvents are not limited to ILs, application of carbon capture as described herein can benefit from properties of ILs, including little or no volatility, thermal stability, and high $CO_2$ solubility. Increasing or maximizing the molar concentration of $CO_2$ capture agents in the IL promotes transfer efficiency of $CO_2$ in the thiocarbonate adduct. A suitable range of concentration of the precursor in the solvent may be, for example, between about 1 mM and saturation at room temperature, depending at least on the on the nature of the solvent and the precursor.

Theoretical/computational modeling allows rapid screening of the $CO_2$ capturing abilities of ionic liquids through the screening of different compounds (thiolates) for their binding strength with $CO_2$. Energies of the lowest unoccupied molecular orbital (LUMO) of the disulfide and the highest occupied molecular orbital (HOMO) of the thiocarbonate can be estimated, and under some physical constraints regarding the nature of electrode processes and the description of interfacial charge transfer, HOMO energy can be correlated to the reduction potential for obtaining the thiolate, and the LUMO energy can be correlated to the oxidation potential at which $CO_2$ will be released. Calculations carried out at the density functional level of theory (DFT) with moderately-sized basis sets yield trends in good agreement with experiment. Apart from the HOMOs and the LUMOs, these calculations reproduce quite well the vibrational properties of these systems, which can be useful in characterizing the various species generated during the electrochemical process.

While the chemical efficacy of these systems can be obtained from a detailed investigation of their electronic structure, a physical parameter useful for characterizing these ionic liquids is their melting point. Unlike typical ionic solids such as $[Na^+][Cl^-]$, dispersion and induction energies can contribute significantly to the interaction energy. While the shallow energy potentials can provide an explanation for the origin of the low melting temperature of these ionic liquids, it also implies that any theoretical method capable of predicting the melting points of these ionic liquids should be able to accurately account for dispersion as well as induction energies, a difficult task for existing ab initio methods.

Molecular dynamics simulations of a perfect lattice at increasing temperatures (the temperature at which the lattice breaks down corresponds to the melting point) are generally known to be a straightforward way to calculate the melting point. Most classical molecular dynamics simulations provide good estimates of the melting points for simple systems, but there is a high degree of variability for complex ionic liquids. Carrying out these molecular dynamics simulations based on ab initio estimates of the energies can, to a large extent, minimize this variability.

Figure 2:
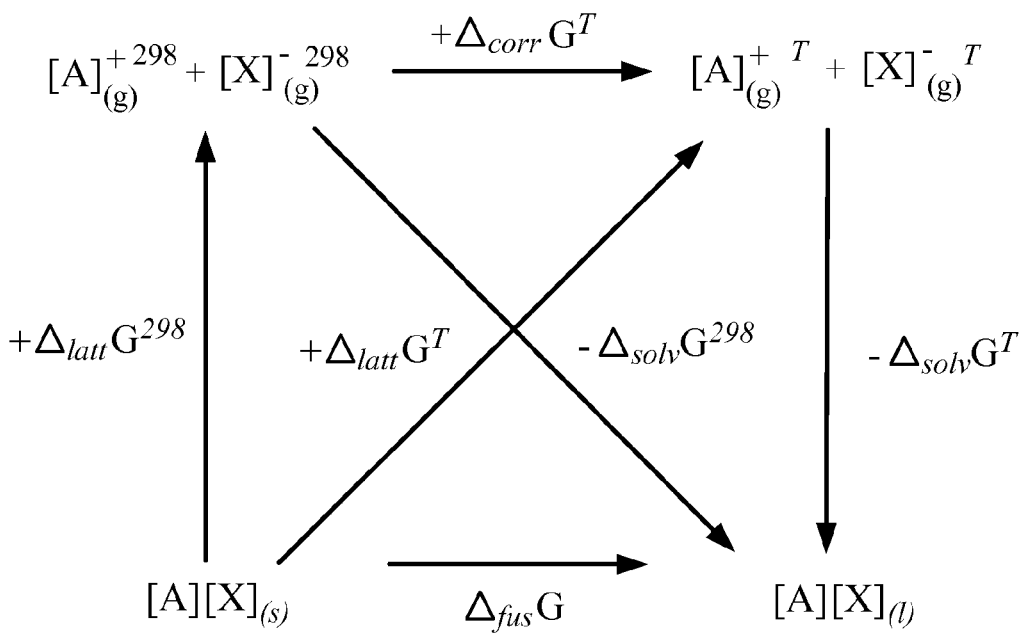
FIG. 2 depicts a Born-Fajans-Haber cycle for the melting (fusion) of a binary salt composed of complex ions ([A$^+$][X$^-$]) at different temperatures (298.15 K and T).

Another method for the prediction of melting points is based on quantitative structure property relationship (QSPR) models. In this method, the melting point of the ionic liquid is estimated from the Gibbs free energy of fusion ($\Delta G_{fus}$) for the process {Ionic Liquid (s)→Ionic Liquid (1)}. The calculation of the Gibbs free energies involves a Born-Fajans-Haber cycle, shown in FIG. 2, that is closed by the lattice {i.e., Ionic Liquid (s)→Ionic Liquid (1)} Gibbs energy and the solvation {i.e., Ionic Liquid (g)→Ionic Liquid (1)} Gibbs energies of the constituent ions in the molten salt. These methods are useful for predicting the properties of a structurally diverse data set of ionic liquids. Accordingly, QSPR investigations can be used to determine melting points of ionic liquids with HOMO-LUMO energy differences that are attractive for the electrochemical $CO_2$ separation.

Any of a variety of disulfides may be used as precursors for capture agents. Suitable disulfides can be selected based at least in part on one or more of the following characteristics: solubility in the chosen solvent, a reduction potential (i.e., the applied potential necessary to effect the reduction process in Equation 1) that is not too negative, rapid reduction kinetics to generate the thiolate (the capture agent), rapid reaction with $CO_2$ to produce the thiocarbonate, a potential for oxidation of the resulting thiocarbonate (i.e., the potential at which the thiocarbonate is rapidly oxidized as shown in Equation 3) that is not too far positive from the reduction potential of the disulfide, rapid oxidation kinetics for the thiocarbonate, lack of side reactions that affect the chemical stability of the thiolate after it is formed but before it reacts with $CO_2$, lack of side reactions that affect the chemical stability of the thiocarbonate before it is oxidized as shown in Equation 3, lack of side reactions that affect the chemical stability of the oxidation products of the thiocarbonate and their ability to regenerate $CO_2$ and the disulfide precursor, and others. In some cases, favorable $CO_2$ capture agents are selected at least in part based on melting point.

In certain cases, the disulfide bears a charged (ionic) group on the R (and/or R') moiety, since this can reduce the volatility of the disulfide precursor, thereby reducing its unintentional loss from the solvent. Thus, the charged disulfide may be part of the ionic liquid (e.g., it may include one of the cations in the ionic liquid). An example of such a charged disulfide is $(CH_3)N^+(CH_2)_2SS(CH_2)_2N^+(CH_3)_3$, which can be reduced to give two equivalents of the thiolate species $(CH_3)_3N^+(CH_2)_2S^-$. In this case the disulfide is a dication, which can contribute to reduced volatility. The thiolate and the thiocarbonate that results from reaction with $CO_2$ $((CH_3)_3N^+(CH_2)_2SCO_2^-)$ are both zwitterions, which can also contribute to reduced volatility. In some cases, the presence of positive charge on the disulfide leads to a less negative reduction potential, resulting in a lower overall energy consumption for the capture/release process, as well as a decreased influence of unwanted side reactions between the thiolate and other compounds that may be present (such as oxidation of the thiolate by oxygen), which would interfere with the reaction with $CO_2$. This example of a disulfide and its desirable characteristics are given by way of illustration and should not be construed as limiting, since many different disulfides may be used, as noted herein.

The reaction scheme embodied by Equations 1-3 is general. As such, many thiol/disulfide redox couples are suitable for this set of reactions, and the kinetics and redox potentials of the reactions in Equations 1-3 can be tuned to achieve fast, energy efficient $CO_2$ capture and controlled release.

Figure 3:
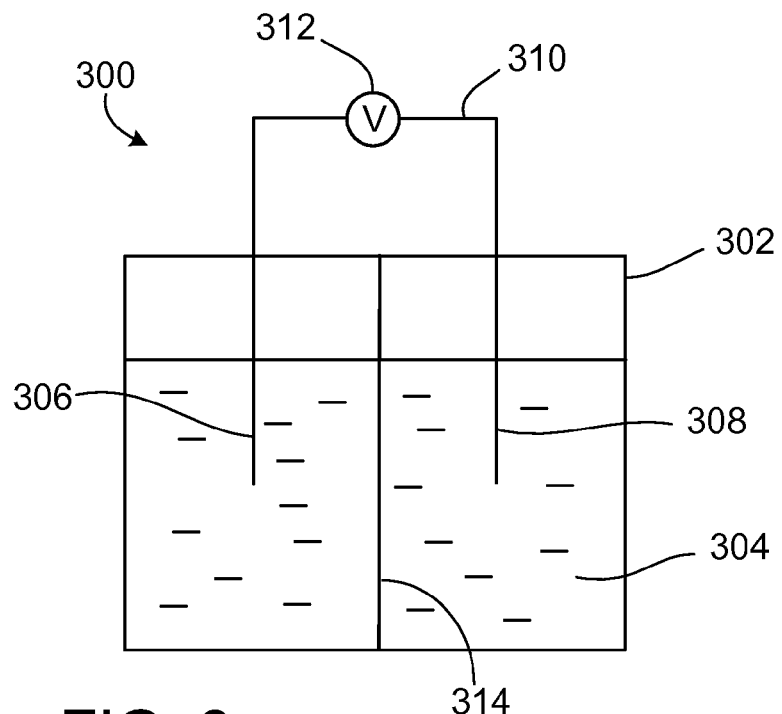
FIG. 3 depicts an electrochemical cell for capture and release of carbon dioxide.

As described herein, electrochemical methods can be used to generate nucleophiles to capture $CO_2$, and the resulting adducts can be electrochemically oxidized to release the $CO_2$. FIG. 3 depicts electrochemical cell 300 for effecting the reactions shown in Equations 1-3. Electrochemical cell 300 includes vessel 302 with mixture 304. Mixture 304 includes a solvent and a precursor. First electrode 306 and second electrode 308 are immersed in mixture 304. First electrode 306 and second electrode 308 are electrically connected through circuit 310 having external power source 312. The reduction step (Equation 1) occurs proximate first electrode 306, and the oxidation step (Equation 3) occurs proximate second electrode 308. Vessel 302 may be closed, such that $CO_2$ released from the oxidation step is collected and optionally further processed (e.g., purified, compressed, etc.). In some cases, electrochemical cell 300 includes separator 314 between first electrode 306 and second electrode 308. Separator 314 may be selected based on its ability to inhibit physical mixing between the first electrode compartment and the second electrode compartment while still allowing ionic current to flow between the two compartments. An example of such a separator is porous polyethylene film, such as a CELGARD membrane. In some cases, an infrared $CO_2$ sensor measuring $CO_2$ appearance in the exit stream may be coupled to an electrochemical cell, thereby demonstrating electrochemically facilitated $CO_2$ transport with the electrochemical cell.

As described herein, electrochemical separation includes reduction of a disulfide at the cell cathode to generate two thiolates. The cathode is on the $CO_2$ feed side of the cell. The electrochemically generated thiolates capture $CO_2$, thereby producing thiocarbonates. The thiocarbonates are driven by electromigration across the cell and are oxidized at the anode. This releases $CO_2$ and regenerates the disulfide, which migrates back to the cathode down a chemical potential gradient. The capture and release chemistry of this separation scheme is demonstrated herein with compounds including benzyl disulfide (BDS), bis(4-aminophenyl)disulfide (APD), and bis(4-methoxyphenyl)disulfide (MPS). These compounds and others can be chosen to manipulate the electron density on the thiolate S, thereby changing the nucleophilicity of the thiolate in its reaction with the $CO_2$ electrophile. For these cases, the thiolate reacts with $CO_2$ at a rate that is faster than can be measured using standard cyclic voltammetric techniques. Given typical operating conditions, this gives a lower limit for the second order rate constant for the reaction of thiolate with $CO_2$ to produce thiocarbonate of $10^4 M^{-1} s^{-1}$. Thus, the reaction between these nucleophilic thiolates and $CO_2$ is quite fast, thereby decreasing or eliminating the competitive, parasitic reaction between the thiolate anion and dioxygen (a component of flue gas).

The reaction between a thiolate and dioxygen is most likely to occur by a one-electron oxidation of the thiolate to produce a sulfur-based radical (RS., which quickly reacts with another radical to produce the disulfide) and one equivalent of superoxide, $O_2^-$. There is a kinetic barrier to this reaction that relates to the reorganization energies of the $RS^- \leftrightarrow RS.+e^-$ and the $O_2+e^- \leftrightarrow O_2^-$ electron transfer reactions as described by Marcus theory. The relative reaction rates for $CO_2$ capture, i.e. $RS^-$ reacting with $CO_2$, and the competitive, parasitic reaction between $RS^-$ and $O_2$, influence the efficiency of $CO_2$ by the nucleophilic thiolates. Electrochemical and spectroscopic techniques (e.g., nuclear magnetic resonance) can be used to measure the rate constants for the reaction of $RS^-$ with $O_2$ for selected thiolates. Thiolates that experience sufficiently slow reactions with $O_2$ (and thus faster reactions with $CO_2$) are thought to be particularly advantageous.

Several implementations of electrochemical methods can be used to generate nucleophiles to capture $CO_2$ and to oxidize the adducts to release the $CO_2$. In some cases, an electrochemical cell includes a cathode and an anode at which Equations 1 and 3, respectively, may be caused to occur simultaneously and continuously. In such a configuration, $CO_2$ capture may be achieved continuously in the cathode compartment by causing Equations 1 and 2 to occur in the cathode. Solution from the cathode compartment may flow into the anode compartment where Equation 3 occurs continuously. Thus, a $CO_2$ capture and release process can be operated continuously, with capture occurring in the cathode compartment and release occurring in the anode compartment. If the cathode and anode compartments have gas atmospheres that are isolated from each other, this would allow the capture of $CO_2$ from a gas stream, for example, and release of $CO_2$ into a different gas stream, thereby effecting a separation of $CO_2$ from the incoming gas stream and its enrichment in an outgoing gas stream.

Figure 4:
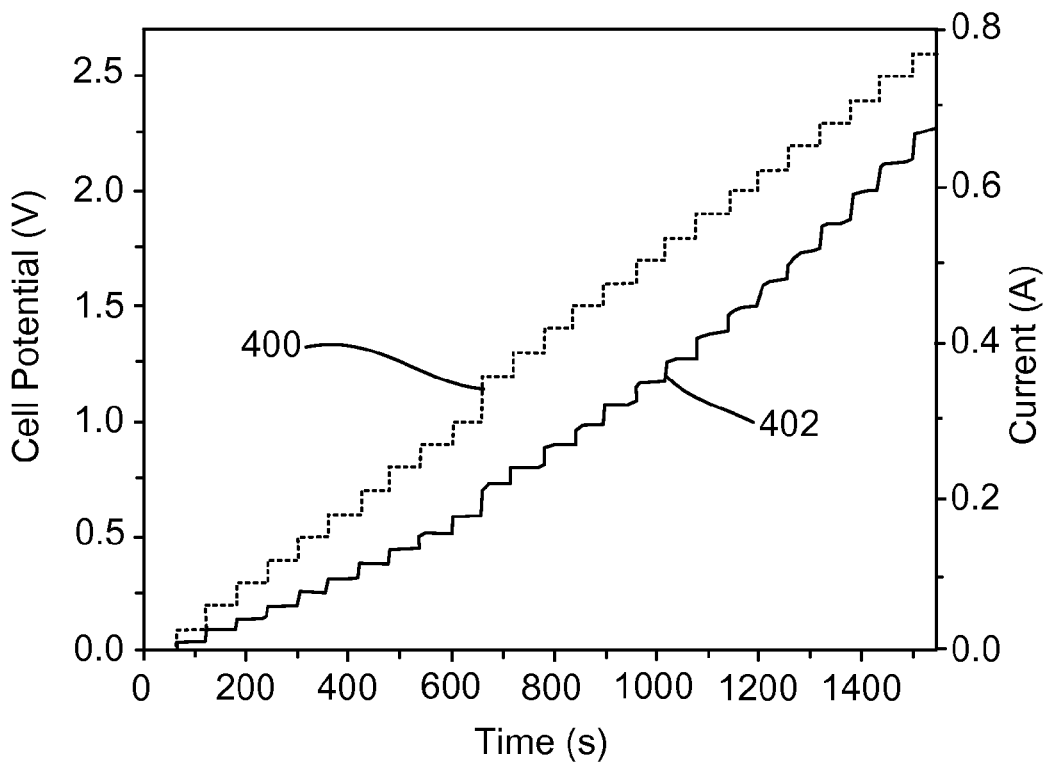
FIG. 4 shows the response of an electrochemical cell with a thiolate ionic liquid containing a dissolved disulfide.

FIG. 4 shows a typical electrochemical response for an electrochemical cell with the cell having an ionic liquid including $BMP^+$ $(C_6H_6)CH_2S^-$ (i.e., an ionic liquid having a BMP cation and a benzylthiolate anion) and benzyl disulfide dissolved in the ionic liquid. Thus, the IL contains both an oxidizable species, $(C_6H_6)CH_2S^-$, and a reducible species, $(C_6H_6)CH_2SSCH_2(C_6H_6)$, facilitating a two electrode operation. Unless otherwise noted, data described herein was collected at room temperature. Plot 400 corresponds to stepping the potential applied across the cell in 100 mV increments and plot 402 corresponds to current flow through the cell. As shown in FIG. 4, the current starts at essentially zero and increases exponentially as the potential across the cell is increased. This is the behavior expected if thiolate oxidation occurs at the anode and disulfide reduction occurs at the cathode. This experiment confirms that the cell operates as expected and is capable of supplying quite high current densities, approaching 1 A cm$^{-2}$.

To judge overall cell performance, measurements of mass balance and energy balance in the cell can be made. Measuring the total energy input into the cell and the mass balance for $CO_2$ during operation allows assessment of various aspects including, for example, the energy efficiency of the $CO_2$ separation process in the cell under a given set of conditions and the dependence of energy efficiency on changes in variables like operating temperature and % reduction in $CO_2$ emission (e.g., the amount of $CO_2$ extracted at the anode side of the cell compared to the amount that enters the cell in the feed stream). Mass balance measurements for $CO_2$ can be made with knowledge of three $CO_2$ fluxes, namely $CO_{2\ in\ feed}$, $CO_{2\ out\ feed}$, and $CO_{2\ out\ exit}$, which correspond to the $CO_2$ fluxes entering the cell in the feed stream, exiting the cell in the feed stream and exiting the cell in the exit stream, respectively. The difference between the first two fluxes gives the amount of $CO_2$ extracted from the feed stream, and should be equal to the flux in the exit stream. All three can be measured using commercially available infrared $CO_2$ sensors. Energy input into the cell can be measured using a combination of electrical measurements (power×time) and calorimetric measurements using either an open or closed cell configuration.

The energy required for the round trip capture and release of $CO_2$ in a continuous process such as that described herein depends at least in part on the potential necessary for the reduction of the disulfide and the potential required for the oxidation of the thiocarbonate. A theoretical estimate of this round trip energy, $\Delta G_{rt}$, is given by $\Delta G_{rt}=-nF\Delta E$, where n is the number of electrons per mole of $CO_2$ involved in each of the capture and release processes (n=1 in this case), F is the Faraday constant, and $\Delta E$ is the difference between the potential required to reduce the disulfide to generate the thiolate (shown in Equation 1 above) and the potential required to oxidize the thiocarbonate to release the $CO_2$ and regenerate the disulfide (shown in Equation 3 above).

Figure 5:
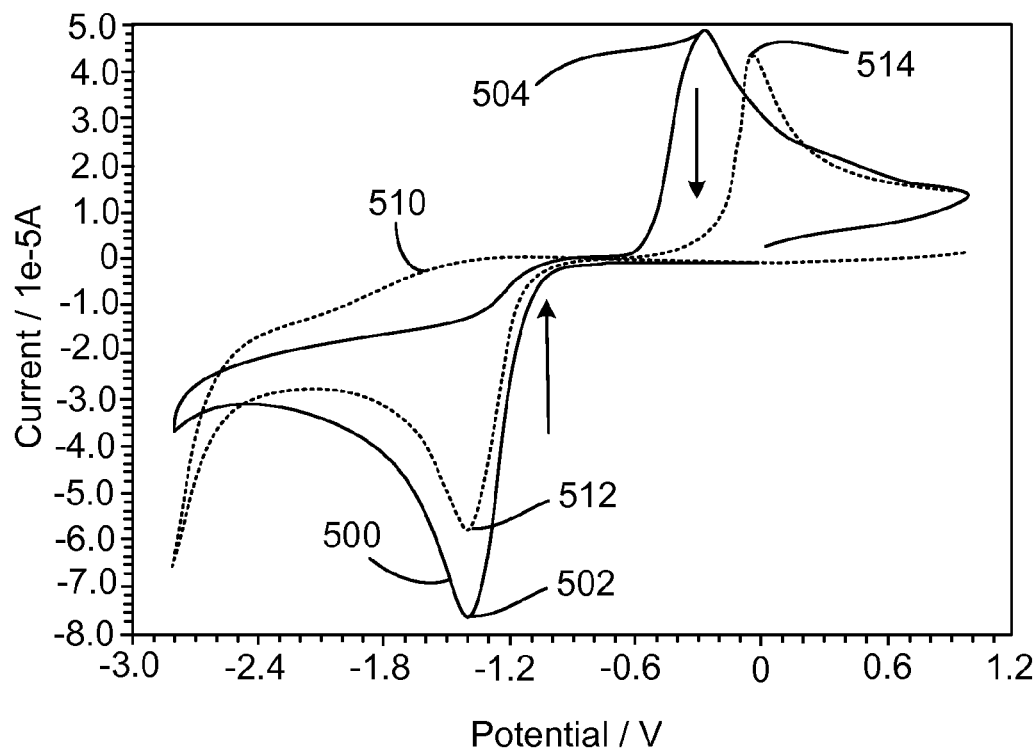
FIG. 5 shows a cyclic voltammogram of an electrochemical process including reduction of bis-(4-methoxybenzyl)disulfide (MBS) in an ionic liquid to yield a nucleophilic thiolate, formation of a $CO_2$ adduct (thiocarbonate), and oxidation of the thiocarbonate to regenerate the MBS and release $CO_2$.

The reactions shown in Equations 1-3 are illustrated in FIG. 5, which shows the onset potentials for the reduction of 20 mM bis-(4-methoxybenzyl) disulfide (MBS) in BMP TFSI at about −1.0 V (upward pointing arrow) and the oxidation of the thiocarbonate at about −0.4 V (downward pointing arrow) for. Plot 500 is for a solution containing 20 mM MBS in BMP TFSI under nitrogen (i.e., free of $CO_2$), and plot 510 is for a solution containing the disulfide under one atmosphere of $CO_2$.

Under $N_2$ (plot 500) one observes a (formally) two electron reduction with a current peak 502 at about −1.4 V that corresponds to reduction of MBS to produce two equivalents of thiolate. Oxidation of the thiolate is observed on the subsequent positive-going scan with an anodic wave with current peak 504 at about −0.3 V, regenerating the disulfide. This voltammetry is consistent with the known electrochemical behavior of thiolate/disulfide redox couples. The mechanism for this apparently simple redox transformation is believed to be complex, involving multiple electron transfers and a variety of intermediates.

In the presence of $CO_2$ (plot 510), peak 512 indicates that the thiolates are produced at essentially the same potential as under $N_2$, thought to be related to domination of the reduction potential by the lowest unoccupied molecular orbital (LUMO) of MBS. After their formation, the thiolates react rapidly with $CO_2$, producing thiocarbonates. Thiocarbonate oxidation is observed on the subsequent positive-going scan by an anodic wave with current peak 514 at 0.0 V. This potential is thought to be dominated by the highest occupied molecular orbital (HOMO) of the thiocarbonate. The (onset) potential difference between the disulfide reduction and thiocarbonate oxidation is indicated by the upward pointing arrow at about −1.0 V and the downward pointing arrow at about −0.4 V. This is the potential difference used to calculate the $\Delta G_{rt}$ value. This potential difference, which is influenced by the thiocarbonate HOMO—disulfide LUMO energy difference, is understood to be a factor in the overall energy cost for separating $CO_2$ using this electrochemical cycle.

Figure 6:
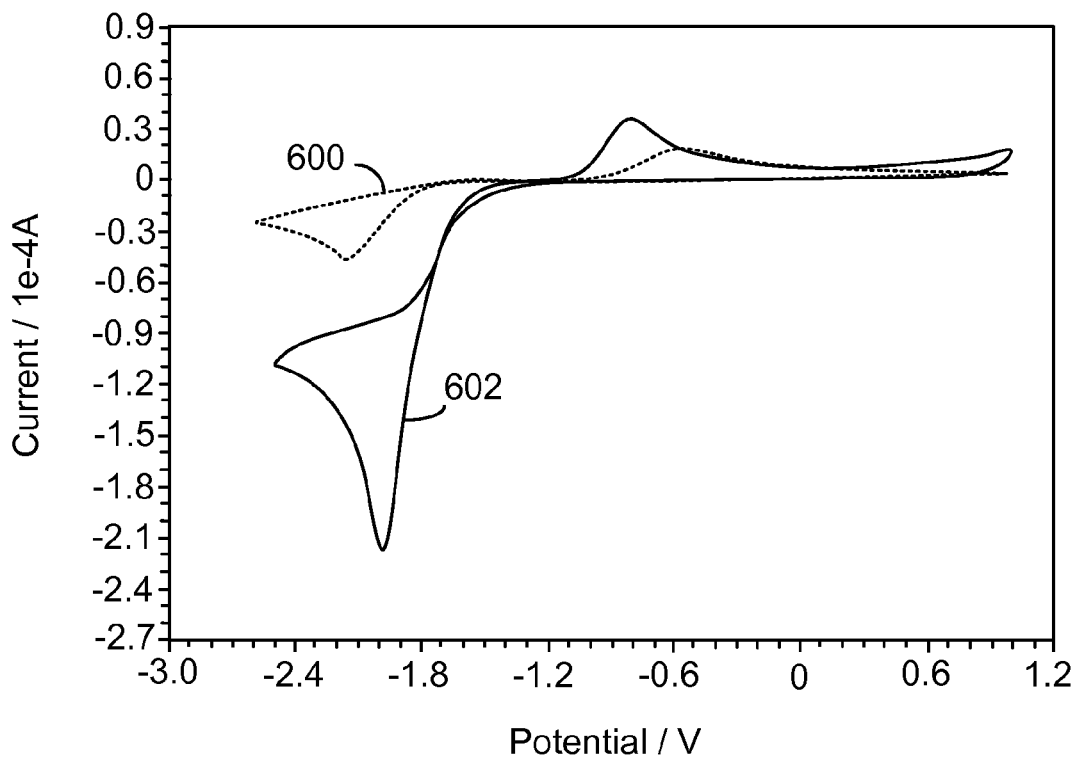
FIG. 6 shows a decrease in energy difference for reduction and oxidation of the MBS described with respect to FIG. 5 as T is increased from 25° C. to 100° C.

Based on $\Delta G_{rt}$ as calculated from FIG. 5 above, MBS captures and releases one mole of $CO_2$ per electron at $\Delta E=0.6$ V, leading to an estimated energy requirement of 58 kJ/mol $CO_2$ or 1315 kJ/kg $CO_2$. As shown in FIG. 6, this voltage difference can be decreased by more than a factor of two by increasing the temperature (T) from 25° C. (plot 600) to 100° C. (plot 602), suggesting energy consumption of 500-600 kJ/kg $CO_2$, or about 50% of that for ethanolamine (MEA) is attainable with disulfides described herein. Thus, an energy consumption performance metric for the process described herein is roughly 50% of that for the MEA process.

As noted herein, one contributor to the energy difference between disulfide reduction and thiocarbonate oxidation is the disulfide LUMO-thiocarbonate HOMO energy difference. In addition, electron transfer kinetics for the electron transfers into and out of these orbitals, respectively, can also influence the energy difference. For the system described with respect to FIG. 6, the large Marcus reorganization energy associated with bond breaking for both steps (S—S bond cleavage after disulfide reduction and S—C bond cleavage after thiocarbonate oxidation) leads to a relatively strong temperature dependence of the electron transfer rate constants for these processes. This allows the use of elevated temperature to obtain a smaller potential difference. Second, by use of elevated temperature (above 100° C.), the influence of $H_2O$ on the electrochemical or chemical reactions that make up the capture and release cycle is minimized or eliminated altogether. This is notable, since the presence of water could drive unwanted reactions with even small traces of $O_2^-$ that might result from oxidation of $RS^-$ by $O_2$. These unwanted reactions could include production of hydrogen peroxide, a highly reactive product. Thus, operating an electrochemical separation process in an IL at a temperature sufficiently above 100° C. reduces the amount of water present in the system, thereby reducing these undesirable side reactions. This desire to operate at elevated temperature, both to achieve small disulfide reduction—thiocarbonate oxidation potential differences and to maintain near-zero water concentrations in the electrochemical supporting electrolyte, is a factor in the use of ILs as the electrochemical media.

In another example, the ionic liquid is 1-butyl-1-methylpyrrolidinium bis(trifluoromethylsulfonyl)imide (BMP TFSI) and the disulfide is benzyldisulfide ($PhCH_2SSCH_2Ph$) (50 mM), which is reduced to give two equivalents of the corresponding benzyl thiolate, $PhCH_2S^-$. This thiolate reacts with $CO_2$ to give S-benzyl thiocarbonate, $PhCH_2SCO_2^-$. This thiocarbonate is reoxidized to give $CO_2$ and the benzyl disulfide starting material. This sequence represents the round trip cycle of $CO_2$ capture and release.

Figure 7A:
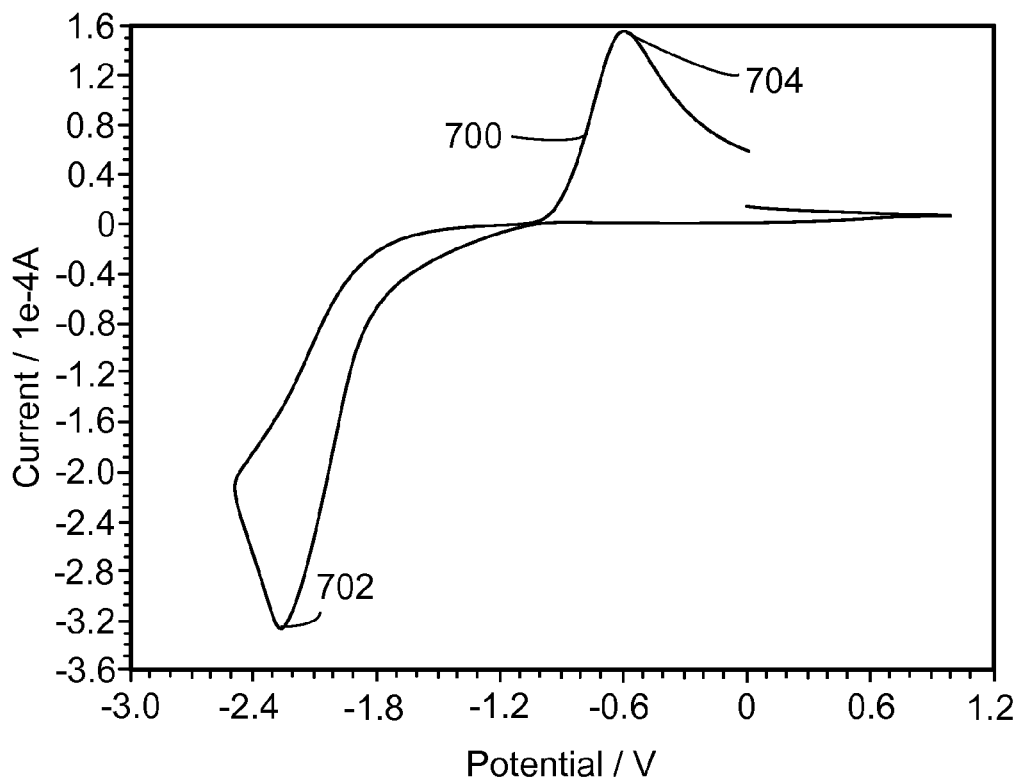
FIG. 7A shows a cyclic voltammogram of an electrochemical process including reduction of benzyl disulfide (BDS) in an ionic liquid to yield a nucleophilic thiolate and oxidation of the thiolate to regenerate the benzyl disulfide.

FIG. 7A shows the cyclic voltammogram 700 recorded at a glassy carbon electrode in 50 mM $PhCH_2SSCH_2Ph$ dissolved in BMP TFSI and purged with $N_2$ (i.e., in the absence of $CO_2$). The reference electrode is a Pt wire quasi-reference. The zero point for this reference is approximately equal to the zero point on a saturated calomel electrode reference scale, meaning that 0 V in the plot corresponds to approximately 0.24 V on a normal hydrogen electrode scale. Potentials are referred to using the quasi-reference potential scale in FIG. 7A. Electrochemical reduction of the disulfide group is observed as a reduction (negative) current with peak 702 at −2.28 V. This reduction corresponds to reduction of $PhCH_2SSCH_2Ph$ to generate two equivalents of $PhCH_2S^−$, the corresponding thiolate. Oxidation of the thiolate to regenerate the disulfide is observed as an oxidation (positive) current with peak 704 at −0.58 V in the positive-going return scan. The reduction potential and reoxidation potentials depend at least in part on the moiety attached to the —S—S— (disulfide) group and the solvent.

Figure 7B:
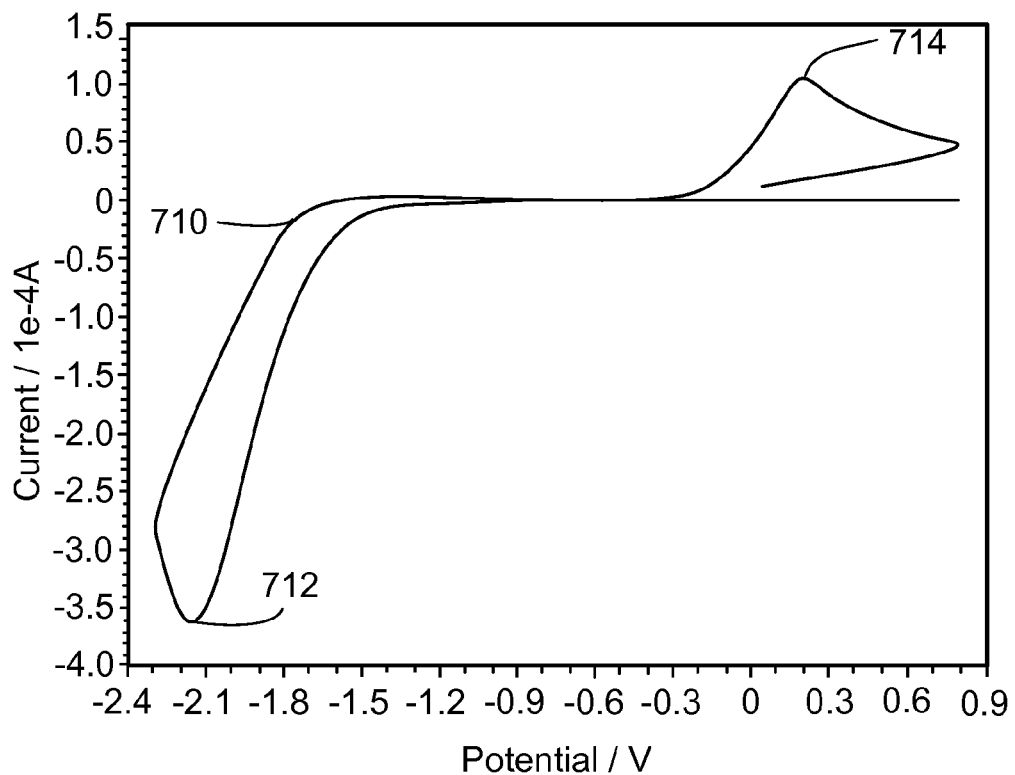
FIG. 7B shows a cyclic voltammogram of an electrochemical process demonstrating reduction of BDS in an ionic liquid in the presence of $CO_2$ to yield a nucleophilic thiolate, the formation of a $CO_2$ adduct (an S-bound thiocarbonate), and oxidation of the thiocarbonate to regenerate BDS and release $CO_2$.

A similar experiment was also conducted after saturating the IL with $CO_2$, giving a $CO_2$ concentration of about 90 mM. FIG. 7B shows the resulting cyclic voltammogram 710. As can been seen, the disulfide reduction portion of the curve is substantially similar to that seen in the absence of $CO_2$. Specifically, it is observed as a reduction current with peak 712 at −2.18 V in the initial negative-going scan. However, on the positive-going return scan, the oxidation of the thiolate back to the disulfide is not observed. Instead, one observes the oxidation of a new species with an oxidation current with peak 714 at a potential of +0.20 V. This corresponds to oxidation of the thiocarbonate species $PhCH_2SCO_2^−$ that results from the reaction of the thiolate with $CO_2$. Thus, the reduction peak corresponds to the reaction of Equation 1 above, the reaction of Equation 2 occurs immediately thereafter, and the oxidation peak corresponds to the reaction of Equation 3 above. That thiolate reoxidation is not observed suggests that the reaction between $PhCH_2S^−$ and $CO_2$ is fast and goes to completion under the conditions of the experiment (approximately 60 mM $PhCH_2S^−$ and 90 mM $CO_2$), and on the time scale of the experiment (approximately 40 seconds at the scan rate used in the experiment). Thus, the $CO_2$ capture event is understood to be electrochemically triggered by reduction of the disulfide, and the $CO_2$ release event is understood to be electrochemically triggered by oxidation of the thiocarbonate species.

Figure 7C:
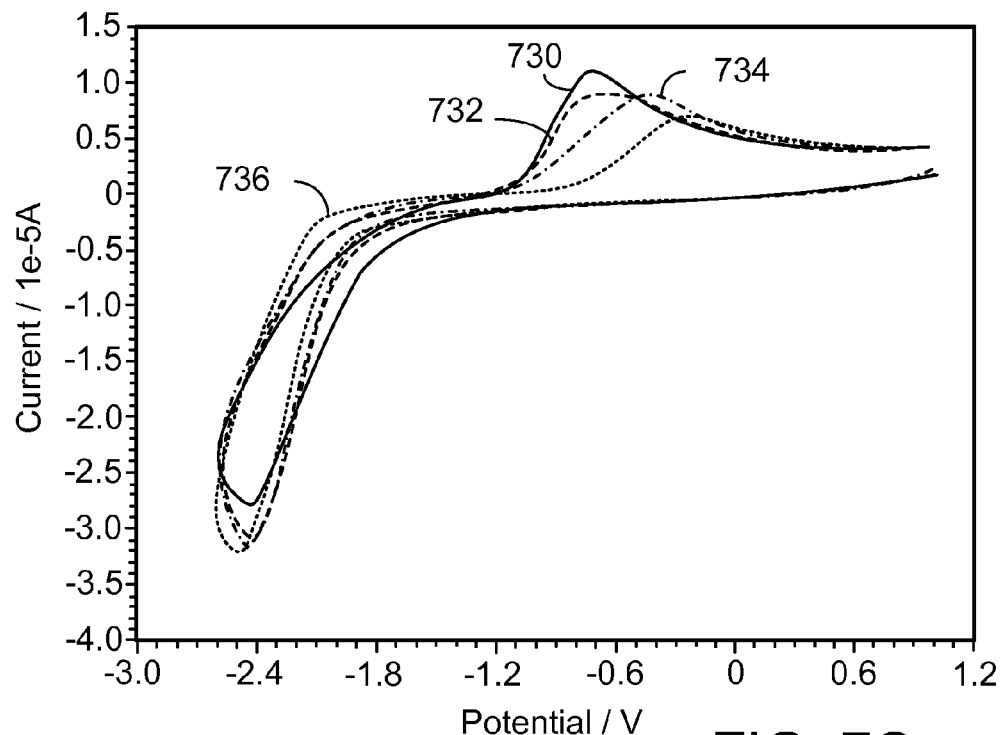
FIG. 7C shows cyclic voltammograms of the electrochemical processes described with respect to FIGS. 7A and 7B, with $CO_2$ concentration increasing from 0 to 20% gas phase partial pressure in equilibrium with a solution of 30 mM BDS in an ionic liquid.

FIG. 7C shows electrochemical data for 30 mM BDS in BMP TFSI in the absence of $CO_2$ (plot 730) and in presence of 3%, 7%, and 20% $CO_2$ (plots 732, 734, and 736, respectively), given as a % gas phase partial pressure in equilibrium with the solution. Increasing the $CO_2$ concentration drives quantitative conversion of the thiolate to the thiocarbonate, which is oxidized at a potential slightly above that for thiolate oxidation. The thiocarbonate has been characterized using vibrational and nuclear magnetic resonance spectroscopy.

In this example, the total energy consumed for the capture and release round trip cycle is estimated from the peak potentials to be 230 kJ/mole $CO_2$. However, the disulfide reduction potential and the thiocarbonate oxidation potential are not believed to be optimized, and the thermodynamic versus kinetic potentials for these processes have not been addressed. Accordingly, the thermodynamic potential difference is expected to be lower than that estimated from the plots shown in FIGS. 7B and 7C above.

Figure 8:
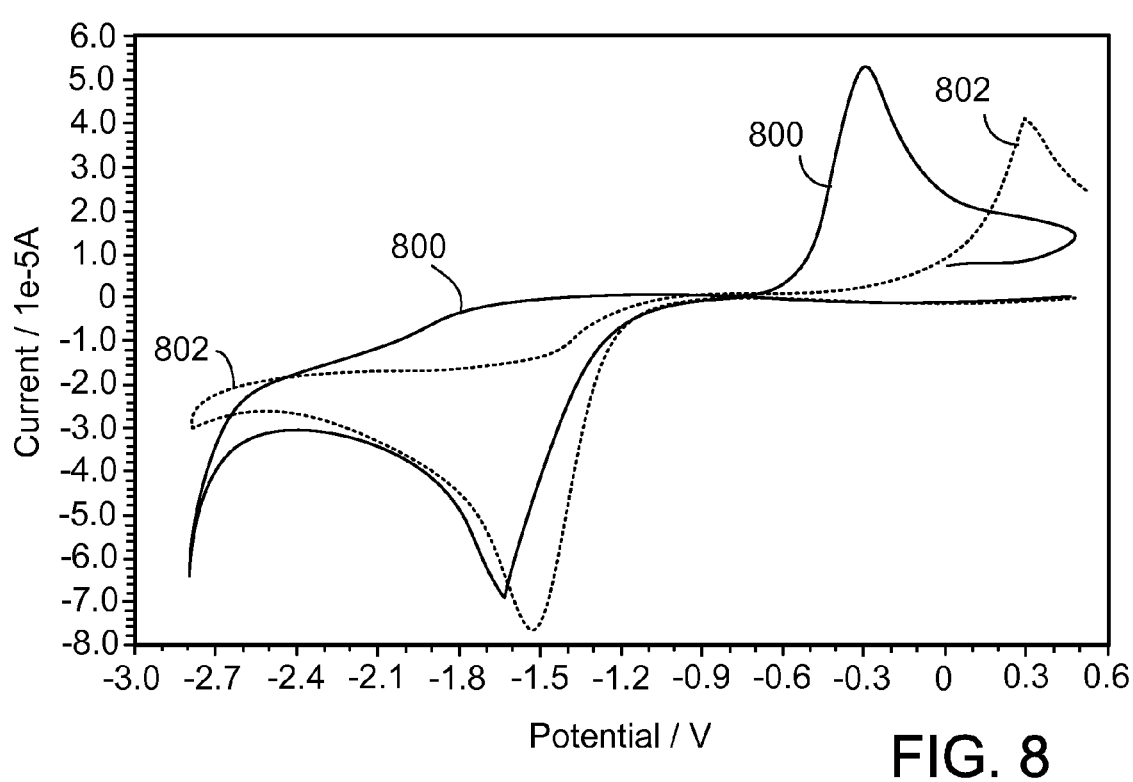
FIG. 8 shows a cyclic voltammogram of an electrochemical capture process with bis(4-aminophenyl)disulfide as a precursor in an ionic liquid.

FIG. 8 shows a cyclic voltammogram illustrating the change in electrochemistry for bis(4-aminophenyl)disulfide without $CO_2$ (plot 800) and with $CO_2$ (plot 802). As can be seen, the same characteristic shift in oxidation potential that was seen for benzyl disulfide is also observed here. In the absence of $CO_2$, the thiolate is oxidized at −0.3 V, while the thiocarbonate is oxidized at 0.3 V. As for the benzyl thiolate, oxidation of the thiocarbonate at 0.3 V leads to release of $CO_2$ from the capture adduct, regenerating the disulfide precursor.

Capture and release of $CO_2$ may also be achieved in other formats. In one example, during reduction of a disulfide at a cathode to effect $CO_2$ capture, another compound (e.g., water) is simultaneously oxidized at the anode. In another example, when the thiocarbonate is oxidized to release $CO_2$, another compound (e.g., $O_2$) is simultaneously reduced at the cathode. Other reactions are also feasible, but these are attractive for large scale application of this $CO_2$ capture/release method.

There are many variations in this method embodied in this disclosure. For example, the thiolate or disulfide may be pendent from one or both of the ionic liquid species (e.g., the cation and/or the anion). The thiols may be pendent from one or both of the IL species. The thiols or disulfides may be incorporated into membranes that allow facile deployment of the IL in various geometries and in various locations. In such a case the membranes may be contacted with electrodes that can supply the electrons for the reactions in Equations 1 and 3. The thiols or disulfides can be immobilized on a conductive support, such as carbon, tin oxide, or doped tin oxide (e.g., indium tin oxide), where the conductive support serves as a source or sink for the electrons involved in Equations 1 and 3. In such a case, the conductive support can be immersed into or otherwise contacted with the IL phase. Separation of $CO_2$ from the source stream can then be achieved by physically removing the support from the source stream.

The capture and release of $CO_2$ may be effected in different locations, allowing, for example, the $CO_2$ to be captured from a gas stream, transported to a different location, and subsequently released for sequestration or use in other processes. Several different approaches to application of this general method are disclosed, with advantages including the fast reaction between the thiolate and the carbon dioxide, the stability of the thiocarbonate, the ability to oxidize the thiocarbonate to regenerate the disulfide thereby releasing the carbon dioxide, and the relatively small difference between the potential for reduction of the disulfide (to generate the thiolate capture agent) and the potential for oxidation of the thiocarbonate (to regenerate the disulfide and $CO_2$). As noted herein, in some embodiments, this potential difference determines the energy required for round trip $CO_2$ capture and release.

Although the reduction and oxidation reactions of Equations 1 and 3, respectively, are depicted as electrochemical reactions, these reactions may also be effected using chemical reducing and oxidizing agents independently or together with the electrochemical reactions. For example, a chemical reductant, such as potassium metal, zinc metal, dithionite, and the like can be used rather than an electrode to effect the reaction of Equation 1, with the minimum reducing power of the reductant determined by the reduction potential of the chosen disulfide. Similarly, a chemical oxidant, such as $Ce^{4+}$, peroxydisulfate ($S_2O_8^{2−}$), and the like may be used rather than an electrode to effect the reaction of Equation 3. Thus, the example of using an electrode to effect the reduction in Equation 1 and the oxidation in Equation 3 should not be construed as limiting.

A number of embodiments of the invention have been described. Nevertheless, it will be understood that various modifications may be made without departing from the spirit and scope of this disclosure. Accordingly, other embodiments are within the scope of the following claims. Further modifications and alternative embodiments of various aspects will be apparent to those skilled in the art in view of this description. Accordingly, this description is to be construed as illustrative only. It is to be understood that the forms shown and described herein are to be taken as examples of embodiments. Elements and materials may be substituted for those illustrated and described herein, parts and processes may be reversed, and certain features may be utilized independently, all as would be apparent to one skilled in the art after having the benefit of this description. Changes may be made in the elements described herein without departing from the spirit and scope as described in the following claims.

What is claimed is:

1. A method for carbon dioxide capture and release, the method comprising:
   contacting a gas comprising carbon dioxide with a mixture comprising a precursor and a solvent, wherein the precursor is a disulfide;
   reducing the precursor to form a capture agent;
   reacting the capture agent with the carbon dioxide to form a non-volatile species containing the carbon dioxide; and
   oxidizing the non-volatile species to regenerate the precursor and to release carbon dioxide.

2. The method of claim 1, wherein the solvent is an ionic liquid.

3. The method of claim 1, wherein a temperature of the solvent is at least 100° C.

4. The method of claim 1, wherein the capture agent is a nucleophile or a thiolate.

5. The method of claim 1, wherein the non-volatile species is a thiocarbonate.

6. The method of claim 1, wherein reducing the precursor comprises electrochemically reducing the precursor.

7. The method of claim 6, wherein electrochemically reducing the precursor occurs proximate a cathode in an electrochemical cell or continuously proximate the cathode.

8. The method of claim 7, wherein electrochemically reducing the precursor occurs continuously proximate the cathode, and further comprising simultaneously oxidizing a reductant at an anode electrically coupled to the cathode.

9. The method of claim 1, wherein contacting the gas with the mixture comprises flowing the gas over or into the mixture.

10. The method claim 1, further comprising collecting, storing, transporting, or any combination of collecting, storing, and transporting, the non-volatile species before oxidizing the non-volatile species.

11. The method of claim 1, wherein the precursor, the capture agent, or both are coupled to the solvent or a membrane, or immobilized on a conductive support.

12. The method of claim 1, further comprising dissolving oxygen in the mixture, and wherein the capture agent reacts with the carbon dioxide to form the non-volatile species more rapidly than with the oxygen dissolved in the mixture.

13. The method of claim 1, wherein contacting the gas with the mixture comprises dissolving the carbon dioxide in the mixture.

14. The method of claim 1, wherein the gas comprising carbon dioxide is a flue gas.

15. The method of claim 1, further comprising combining the precursor and the solvent to form the mixture.

* * * * *